US012619658B2

(12) United States Patent　　　　(10) Patent No.: US 12,619,658 B2

Söderström et al.　　　　(45) Date of Patent: \*May 5, 2026

(54) SYSTEMS AND METHODS FOR INTERLEAVING RECOMMENDED MEDIA ITEMS IN A PLAYLIST

(71) Applicant: Spotify AB, Stockholm (SE)

(72) Inventors: Gustav Söderström, Stockholm (SE); Sandra Kristina Hansson, Kungsbacka (SE); Jason Allen Russell, Prides Crossing, MA (US); Kelly Drecourt, London (GB); Morgan Hecht, Brooklyn, NY (US); Simon Amor, London (GB); Ajay Mathew Kalia, Newton, MA (US); Jeremy Hopple, Jackson, WY (US); Jonathan Marmor, Charlotte, NC (US); Bianca Capretta, Brooklyn, NY (US); Ingrid Maria Pettersson, Tollered (SE); Matthew Budelman, Providence, RI (US); Björn Håkan Lindberg, Gothenburg (SE); Gabriella Maria Eleonora Ljunggren, Stockholm (SE); Ian Alexander Vannest, Boston, MA (US); Tim Olsson Wiklund, Gothenburg (SE); Gastón Montemayor Olaizola, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,303

(22) Filed: Nov. 1, 2024

(65) Prior Publication Data

US 2025/0117425 A1　　Apr. 10, 2025

Related U.S. Application Data

(63) Continuation of application No. 18/048,003, filed on Oct. 19, 2022, now Pat. No. 12,153,625.

(Continued)

(51) Int. Cl.
| *G06F 16/638* | (2019.01) |
| *G06F 3/0482* | (2013.01) |

(Continued)

(52) U.S. Cl.
CPC .......... *G06F 16/639* (2019.01); *G06F 3/0482* (2013.01); *G06F 3/0483* (2013.01);

(Continued)

(58) Field of Classification Search
CPC ...... G06F 16/639; G06F 16/783; G06F 16/64; G06F 16/635; G06F 16/735;

(Continued)

(56) References Cited

U.S. PATENT DOCUMENTS

| 7,743,009 B2 | 6/2010 | Hangartner et al. |
| 10,242,098 B2 | 3/2019 | Koenigstein et al. |

(Continued)

OTHER PUBLICATIONS

Pham, Office Action, U.S. Appl. No. 18/045,086, filed Jul. 3, 2024, 15 pgs.

(Continued)

*Primary Examiner* — Evan Aspinwall

(74) *Attorney, Agent, or Firm* — Morgan, Lewis & Bockius LLP

(57) ABSTRACT

An electronic device provides, to a user, a user-curated playlist, the user-curated playlist including an ordered set of media items that were added by the user. While providing a first media item in the ordered set of media items, the electronic device receives a first user input selecting an option to include recommended media items in the user- (Continued)

(A)

512 In accordance with a determination that the user selects the first recommended media item for playback, update the user-curated playlist to include additional recommended media items for inclusion in the user-curated playlist.

514 In accordance with a determination that the user does not select the first recommended media item for playback, replace the first recommended media item with a second recommended media item at the position in the user-curated playlist in which the first recommended media item was positioned.

516 Update the user-curated playlist to include a plurality of recommended media items. Position a respective recommended media item of the plurality of recommended media items according to a predefined interval in the user-curated playlist in between media items that were added to the ordered set of media items by the user 518 Receive a second user input deselecting the option to include recommendations in the user-curated playlist. In response to the second user input, remove the indication of the first recommended media item from the user-curated playlist.

520 Receive a third user input requesting to save the first recommended media item to the user-curated playlist. In response to the third user input, saving the first recommended media item to the ordered set of media items.

522 Select a third recommended media item to include in the user-curated playlist based on user interaction with a previously presented recommended media item.

curated playlist. In response to the first user input, the electronic device updates the user-curated playlist to include a first recommended media item, the first recommended media item selected without user intervention based at least in part on attributes of the user-curated playlist. The first recommended media item is positioned in the user-curated playlist in between media items that were added to the ordered set of media items by the user.

21 Claims, 9 Drawing Sheets

Related U.S. Application Data

(60) Provisional application No. 63/273,783, filed on Oct. 29, 2021.

(51) Int. Cl.
| | |
|---|---|
| *G06F 3/0483* | (2013.01) |
| *G06F 16/635* | (2019.01) |
| *G06F 16/64* | (2019.01) |
| *G06F 16/735* | (2019.01) |
| *G06F 16/783* | (2019.01) |

(52) U.S. Cl.
CPC ............ *G06F 16/635* (2019.01); *G06F 16/64* (2019.01); *G06F 16/735* (2019.01); *G06F 16/783* (2019.01)

(58) Field of Classification Search
CPC .. G06F 3/0482; G06F 3/0483; G06F 16/4387; H04L 65/1089; H04L 65/60; H04L 65/612; H04L 65/764
USPC ........................................................ 707/748
See application file for complete search history.

(56) References Cited

U.S. PATENT DOCUMENTS

| | | | |
|---|---|---|---|
| 10,645,455 | B1 | 5/2020 | Glaeser et al. |
| 11,086,936 | B2 | 8/2021 | Lamere et al. |
| 2006/0195516 | A1* | 8/2006 | Beaupre ............. H04N 21/4627 707/E17.102 |
| 2009/0063975 | A1* | 3/2009 | Bull ......................... G06F 16/68 707/999.005 |
| 2010/0162115 | A1 | 6/2010 | Ringewald et al. |
| 2012/0088477 | A1* | 4/2012 | Cassidy .................. H04W 4/21 455/414.1 |

| | | | |
|---|---|---|---|
| 2012/0209972 | A1* | 8/2012 | Wong ................. H04N 21/6582 709/223 |
| 2014/0115114 | A1 | 4/2014 | Garmark et al. |
| 2015/0039644 | A1 | 2/2015 | Trivedi |
| 2015/0113407 | A1 | 4/2015 | Hoffert et al. |
| 2015/0212668 | A1* | 7/2015 | Olofsson ............... H04L 67/535 715/739 |
| 2015/0213018 | A1* | 7/2015 | Sanio ................... G06F 16/4387 707/802 |
| 2015/0237389 | A1 | 8/2015 | Grouf et al. |
| 2016/0050446 | A1 | 2/2016 | Fujioka et al. |
| 2016/0299906 | A1 | 10/2016 | Cartoon et al. |
| 2016/0379274 | A1 | 12/2016 | Irwin et al. |
| 2017/0212644 | A1* | 7/2017 | Alsina ................. G06F 16/4387 |
| 2017/0238039 | A1 | 8/2017 | Sabattini |
| 2017/0357479 | A1* | 12/2017 | Shenoy ................... G06F 3/165 |
| 2018/0015369 | A1* | 1/2018 | Schupak ............... G06T 11/206 |
| 2018/0121432 | A1 | 5/2018 | Parson et al. |
| 2018/0189306 | A1 | 7/2018 | Lamere et al. |
| 2018/0196806 | A1 | 7/2018 | Scapa et al. |
| 2018/0268054 | A1 | 9/2018 | Mustain et al. |
| 2018/0322195 | A1* | 11/2018 | Lee ....................... G06F 16/637 |
| 2019/0095891 | A1* | 3/2019 | Bachman ............ G06F 16/4387 |
| 2019/0268392 | A1 | 8/2019 | Santangelo et al. |
| 2019/0377749 | A1* | 12/2019 | Manning ............... G06F 16/951 |
| 2020/0137464 | A1 | 4/2020 | Lewis et al. |
| 2020/0320115 | A1* | 10/2020 | Lewis ................. G06F 16/4387 |
| 2021/0044640 | A1 | 2/2021 | He |
| 2021/0141592 | A1* | 5/2021 | Reese ................... G06F 3/0482 |
| 2021/0342952 | A1 | 11/2021 | Putnam et al. |
| 2022/0067088 | A1 | 3/2022 | Aryan |
| 2022/0067100 | A1 | 3/2022 | Lamere et al. |
| 2022/0207081 | A1 | 6/2022 | Ding |
| 2023/0169113 | A1 | 6/2023 | Pham et al. |

OTHER PUBLICATIONS

Pham, Final Office Action, U.S. Appl. No. 18/045,086, filed Nov. 22, 2024, 16 pgs.
Soderstrom, Office Action, U.S. Appl. No. 18/048,003, filed Nov. 1, 2023, 35 pgs.
Soderstrom, Notice of Allowance, U.S. Appl. No. 18/048,003, filed Apr. 15, 2024, 10 pgs.
Soderstrom, Notice of Allowance, U.S. Appl. No. 18/048,003, filed Aug. 5, 2024, 11 pgs.
Yun He et al., Consistency-aware recommendation for user-generated item list continuation, In The Thirteenth ACM International Conference on Web Search and Data Mining, Dec. 30, 2019, 9 pgs.
Pham, Notice of Allowance, U.S. Appl. No. 18/045,086, filed Jun. 4, 2025, 8 pgs.

* cited by examiner

Media Content
Server 104

500

502 Provide, to a user, a user-curated playlist, the user-curated playlist including an ordered set of media items that were added by the user.

504 While providing a first media item in the ordered set of media items, receive a first user input selecting an option to include recommended media items in the user-curated playlist.

506 In response to the first user input, update the user-curated playlist to include a first recommended media item, the first recommended media item selected without user intervention based at least in part on attributes of the user-curated playlist. The first recommended media item is positioned in the user-curated playlist in between media items that were added to the ordered set of media items by the user.

508 The first recommended media item is an audio item.

510 Display the user-curated playlist on a display of the electronic device. Updating the user-curated playlist to include the first recommended media item includes displaying an indication of the first recommended media item at its respective position in the user-curated playlist.

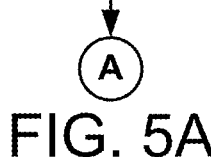

FIG. 5A

512 In accordance with a determination that the user selects the first recommended media item for playback, update the user-curated playlist to include additional recommended media items for inclusion in the user-curated playlist.

514 In accordance with a determination that the user does not select the first recommended media item for playback, replace the first recommended media item with a second recommended media item at the position in the user-curated playlist in which the first recommended media item was positioned.

516 Update the user-curated playlist to include a plurality of recommended media items. Position a respective recommended media item of the plurality of recommended media items according to a predefined interval in the user-curated playlist in between media items that were added to the ordered set of media items by the user.

518 Receive a second user input deselecting the option to include recommendations in the user-curated playlist. In response to the second user input, remove the indication of the first recommended media item from the user-curated playlist.

520 Receive a third user input requesting to save the first recommended media item to the user-curated playlist. In response to the third user input, saving the first recommended media item to the ordered set of media items.

522 Select a third recommended media item to include in the user-curated playlist based on user interaction with a previously presented recommended media item.

FIG. 5B

SYSTEMS AND METHODS FOR INTERLEAVING RECOMMENDED MEDIA ITEMS IN A PLAYLIST

PRIORITY APPLICATION(S)

This application is a continuation of U.S. patent application Ser. No. 18/048,003, filed Oct. 19, 2022, which claims priority to U.S. Provisional Application No. 63/273,783, filed Oct. 29, 2021, each of which is hereby incorporated by reference in its entirety.

TECHNICAL FIELD

The disclosed embodiments relate generally to media provider systems, and, in particular, to temporarily interleaving recommended media items in a user-curated playlist, while the user has turned on a recommendation setting for the playlist, without changing the original media included in the playlist.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, users create and select playlists to easily organize and access media items, including playlists curated by the users themselves and playlists curated by other parties, such as content providers.

SUMMARY

While a user can typically select a curated playlist that includes automatically recommended media content, users often consume playlists that they have curated themselves or that have been curated by other users (e.g., friends of the user). Playlists that users have curated themselves represent the users' own taste profile for digital content, and can often evoke an emotional or nostalgic response for the user. Sometimes, user-curated playlists are associated with a particular event, time, or memory (e.g., a user's wedding playlist), that the user would like to maintain without modification. Such playlists may have been curated by the user's friends, or together with the user's friends. However, when the user selects a user-curated playlist for playback, the user is limited to the content the user added to the playlist and is prevented from discovering new content that is not already in the playlist.

In the disclosed embodiments, systems and methods are provided for presenting the user with recommendations that are interleaved within a playlist that was curated by the user or other users (e.g., friends of the user). The user is enabled to toggle the recommendations on and off within a same user interface in which the user views the playlist (e.g., a user interface that includes representations of media items in the playlist). Thus, the user can easily switch between viewing only the media items in the user's original user-curated playlist, and viewing additional recommended media items interleaved with the media items in the user's original playlist, without affecting the user's stored original user-curated playlist. In this way, the user is able to maintain the user's original playlist without modification while still being presented with recommended media content.

To that end, in accordance with some embodiments, a method is provided. The method includes providing, to a user, a user-curated playlist, the user-curated playlist including an ordered set of media items that were added by the user. The method further includes, while providing a first media item in the ordered set of media items, receiving a first user input selecting an option to include recommended media items in the user-curated playlist. The method includes, in response to the first user input, updating the user-curated playlist to include a first recommended media item, the first recommended media item selected without user intervention based at least in part on attributes of the user-curated playlist. The first recommended media item is positioned in the user-curated playlist in between media items that were added to the ordered set of media items by the user.

In accordance with some embodiments, a computer system is provided. The computer system includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by a computer system with one or more processors. The one or more programs comprising instructions for performing any of the methods described herein.

Thus, systems are provided with improved methods for enhancing a user-curated playlist.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B are flow diagrams illustrating a method of providing recommendations in a user-curated playlist, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
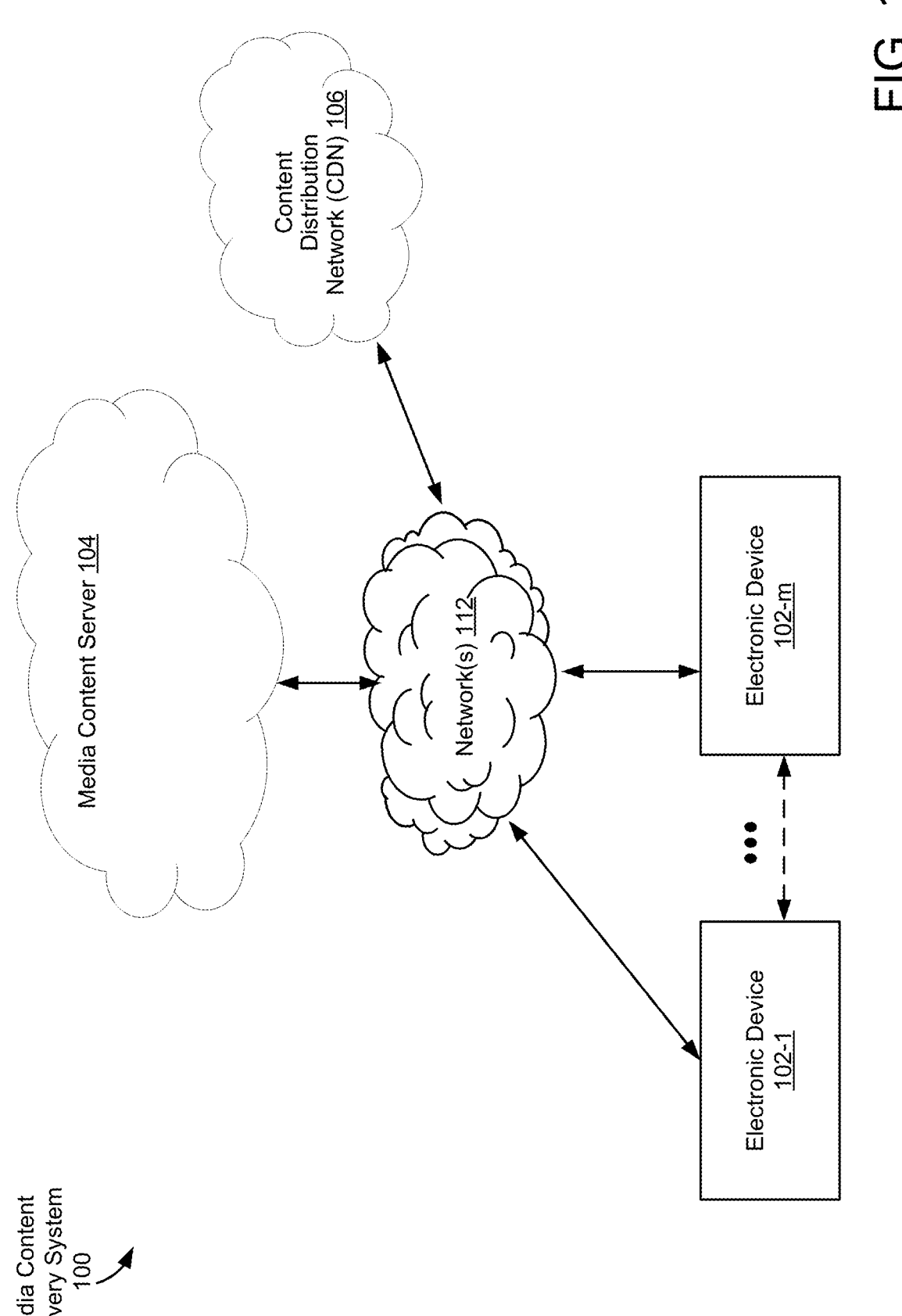
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), digital versatile disk (DVD) player, and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
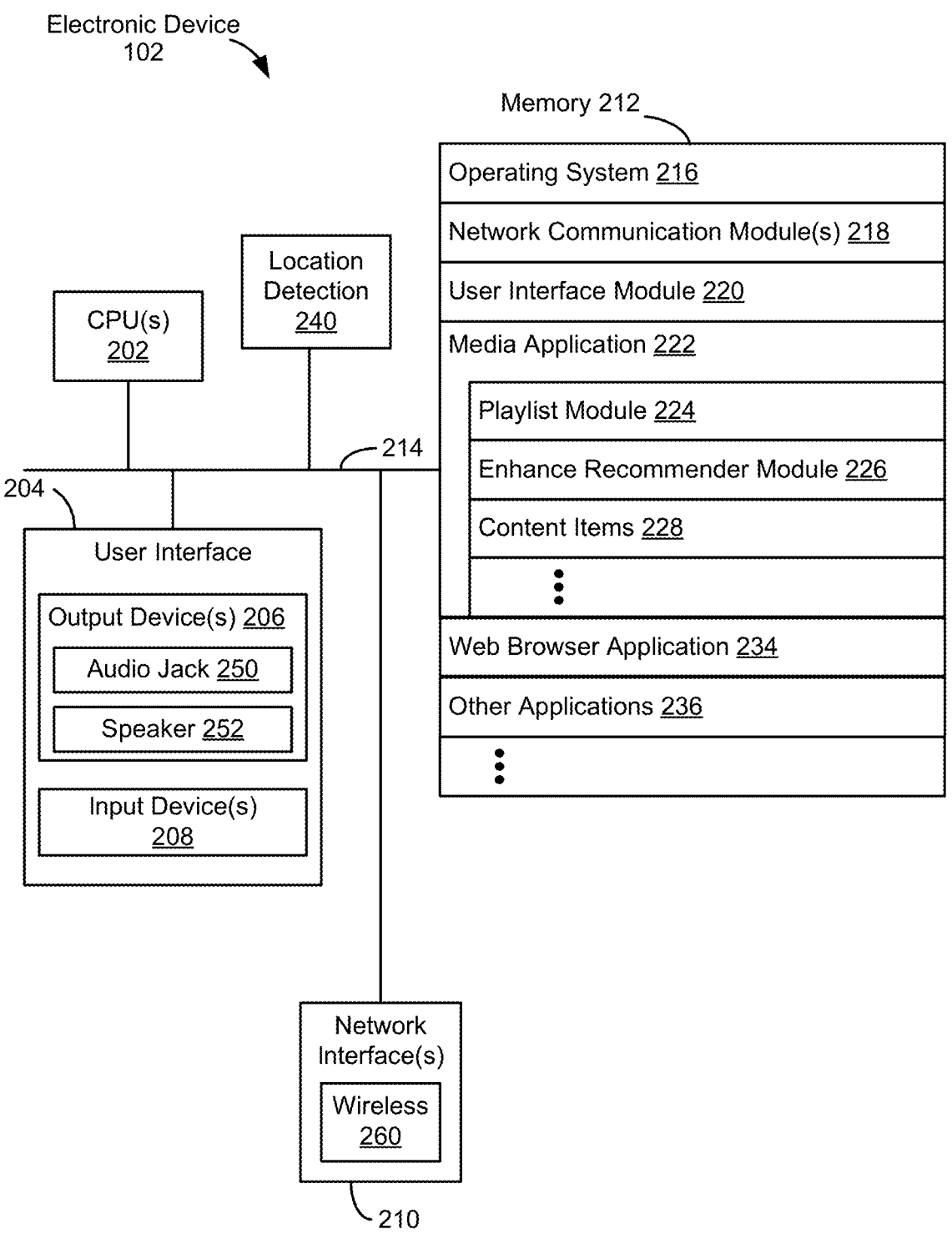
FIG. 2 is a block diagram illustrating an electronic device, in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a playlist module 224 for storing sets of media items for playback in a predefined order, the media items selected by the user (e.g., for a user-curated playlist) and/or the media items curated without user input (e.g., by the media content provider);

an enhance recommender module 226 for identifying and/or displaying recommended media items to include in a playlist;

a content items module 228 for storing media items, including audio items such as podcasts and songs, for playback and/or for forwarding requests for media content items to the media content server;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
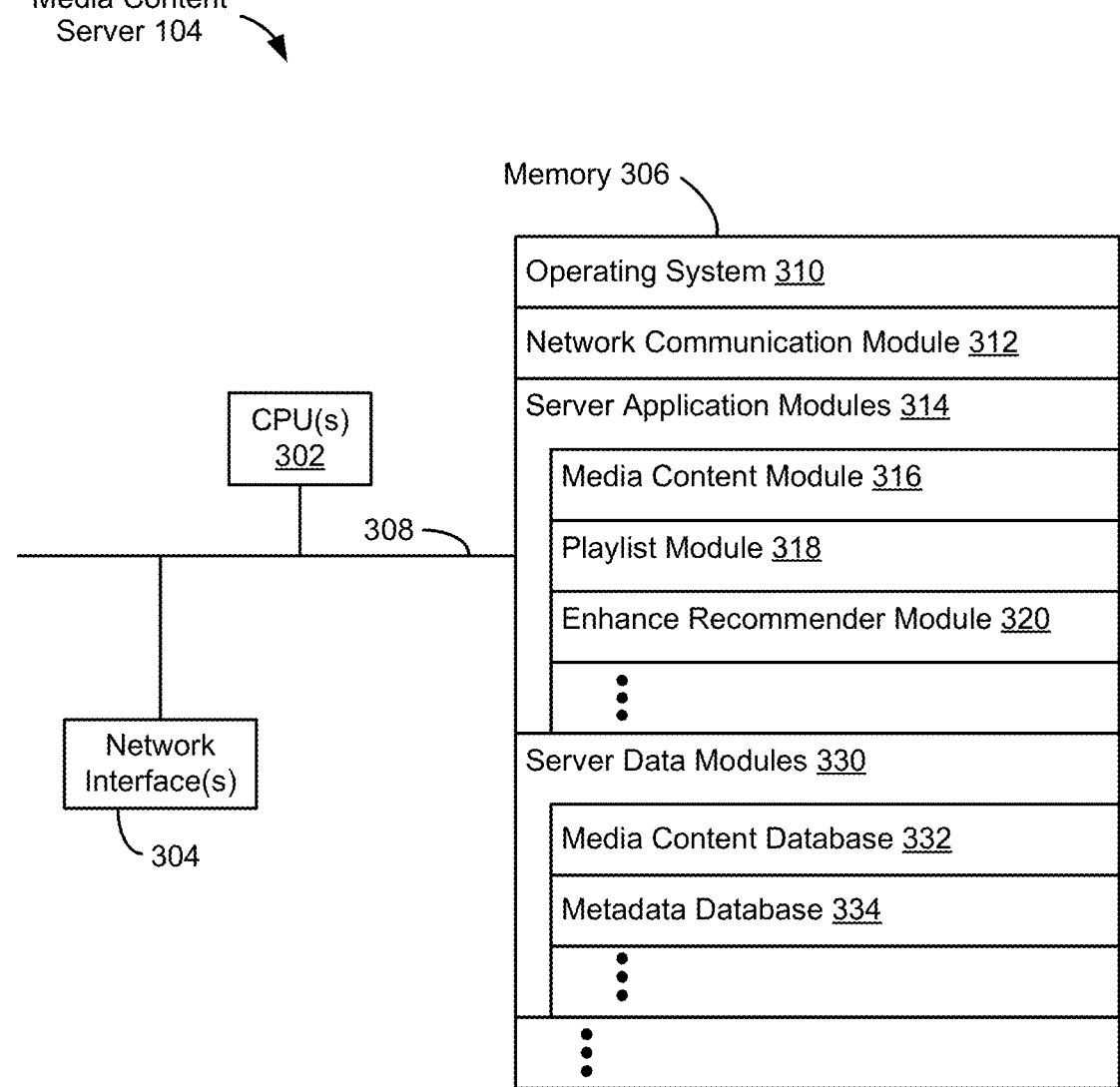
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s);

a playlist module 318 for storing and/or providing (e.g., streaming) sets of media content items to the electronic device;

an enhance recommender module 320 for determining and/or providing recommendations to enhance a selected playlist, as requested by the electronic device;

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figures 4A, 4B:
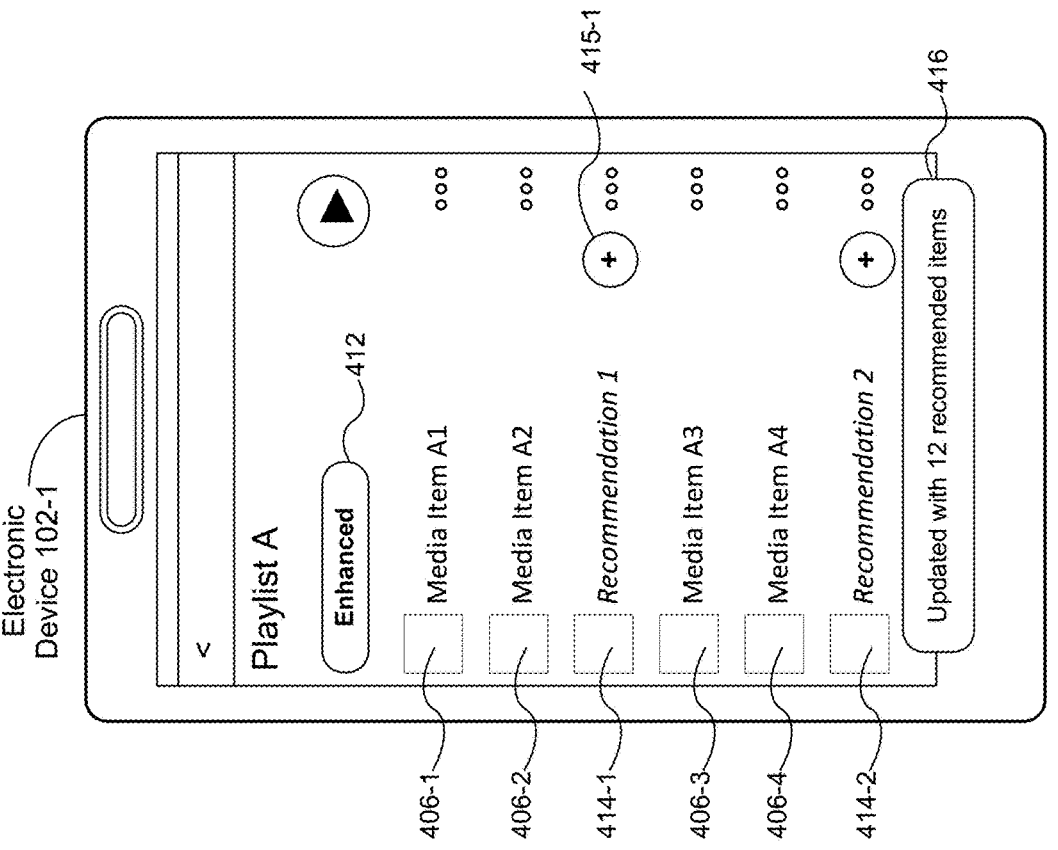
FIG. 4A-4H are block diagrams illustrating user interfaces for displaying recommendations in a playlist, in accordance with some embodiments.

FIGS. 4A-4H are example user interfaces for displaying a playlist on an electronic device 102-1. FIG. 4A illustrates representations of media items in a set of media items 406 that are included in Playlist A 402. For example, the set of media items 406 includes media items 406-1 through 406-6 (e.g., and, optionally, additional media items not currently displayed on the user interface of electronic device 102-1). In some embodiments, each representation of a media item in the playlist includes an indication of the media item (e.g., cover art, a title, and/or additional information about the media item) and a set of options 407 (e.g., options 407-1 through 407-6 corresponding, respectively, to media item 406-1 through 406-6), for performing one or more actions related to the respective media item (e.g., as described below with reference to FIG. 4D). In some embodiments, the user interface includes an option to play 404 the playlist (e.g., for playback at the electronic device, or for playback at another electronic device (e.g., electronic device 102-m)).

In some embodiments, the set of media items 406 is stored in the playlist 402 as an ordered set of media items (e.g., where playback of the playlist includes playing back the set of media items 406 in the order at which they appear in the set). For example, for the user of electronic device 102-1, the set of media items in Playlist A are stored (e.g., in a data structure) in association with the user account (e.g., stored using Playlist Module 224 at the electronic device and/or using Playlist Module 318 at the media content server 104). In some embodiments, the user is provided an option to shuffle the order of the media items in the playlist, which causes playback of the media items to be presented in an order different (e.g., randomized) from the stored order.

In some embodiments, the user interface includes an enhance option 408. The enhance option 408 represents a setting to turn on recommendations to enhance Playlist A 402. For example, the enhance option 408 is displayed concurrently with the display of representations of media items in Playlist A, as illustrated in FIGS. 4A-4H (e.g., without requiring the user to navigate to another user interface to request recommendations). For example, instead of requiring the user to navigate to another user interface to view a list of recommended media items (e.g., recommendations selected based on a playback history of the user and/or recommendations of currently popular media items across all users of the media providing service), the user is enabled to select the enhance option 408 within the user interface that displays Playlist A, and in response to the user's selection (e.g., to toggle the enhance option "on"), the electronic device 102-1 automatically displays representations for recommended media items, as illustrated in FIG. 4B.

For example, while the enhance option 408 is toggled on, an indication 412 is displayed to show the user that Playlist A is currently "Enhanced" with recommended media items. In some embodiments, the recommended media items are selected in accordance with one or more properties of the media items in Playlist A. For example, recommended media items are selected as recommendations based on a similarity between the recommended media item and one or more of the set of media items 406. For example, the recommended media items are selected in accordance with sharing a genre, artist, popularity, date, language, or other feature of one or more media items in Playlist A.

In some embodiments, the electronic device 102-1 interleaves recommended media items (e.g., at predefined intervals) within the set order of media items in Playlist A. For example, Recommendation 1 (414-1) is interleaved after 2 media items that are within Playlist A (e.g., media item A1 and media item A2), and before other media items in the playlist (e.g., media item A3 and media item A4). In some embodiments, a second recommended media item, Recommendation 2 (414-2) is interleaved at a same interval within the playlist as the first recommendation. For example, recommended media items are displayed after every 2 media items of the original Playlist A. In some embodiments, the interval at which to place recommendations within the playlist is determined based on user profile information (e.g., a playback history of the user to determine whether the user selects media items that the user has initiated versus media items that are recommended to the user by the media providing service). In some embodiments, the recommended media items are presented throughout Playlist A (e.g., without following a set interval).

In some embodiments, although recommendations are displayed as interleaved within the set of media items of Playlist A, the Playlist A is not modified (e.g., the set of media items stored in playlist module 224 and/or playlist module 318 does not change) to include the recommended media items. For example, the user is enabled to view the recommended media items while the Enhance feature is toggled on, but if the user returns to view Playlist A (e.g., in another listening session), the set of media items of Playlist A has not changed (e.g., the recommended media items are not added to the set of media items for Playlist A) (e.g., unless the user manually requests to add a recommended media item, as described below). In some embodiments, as described below, the user returns to the original view of the set of media items of Playlist A (e.g., shown in FIG. 4A) in response to toggling the Enhance feature off. As such, the recommended media items are displayed for the user, and presented to the user during the current session while playing back Playlist A (e.g., with the Enhance feature toggled on), but are not stored as media items in Playlist A.

In some embodiments, the electronic device 102-1 displays an indication 416 that a number of recommended items has been added (e.g., 12 recommended items). In some embodiments, the number of recommended items is based on a number of media items in the original playlist. For example, in order to insert a recommended media item at an interval of every two media items, Playlist A includes at least 24 media items.

In some embodiments, the representations of the recommended media items are visually distinguished from the representations of the media items in Playlist A. For example, FIG. 4B illustrates the recommendations displayed with italicized text. Other visually distinguishing features may be used; for example, the representations of the recommended media items may appear indented, with different shading and/or color, and/or with an indication (e.g., icon) next to the items, etc.

In some embodiments, the representations of the recommended media items are displayed with an option to add the recommended media item to the playlist. For example, the representation of Recommendation 1 is displayed with option to add 415-1. In some embodiments, in response to the user selecting the option to add 415-1 a recommended media item to the playlist, the set of media items for Playlist A is updated to include the recommended media item, as described in more detail below.

Figure 4D:
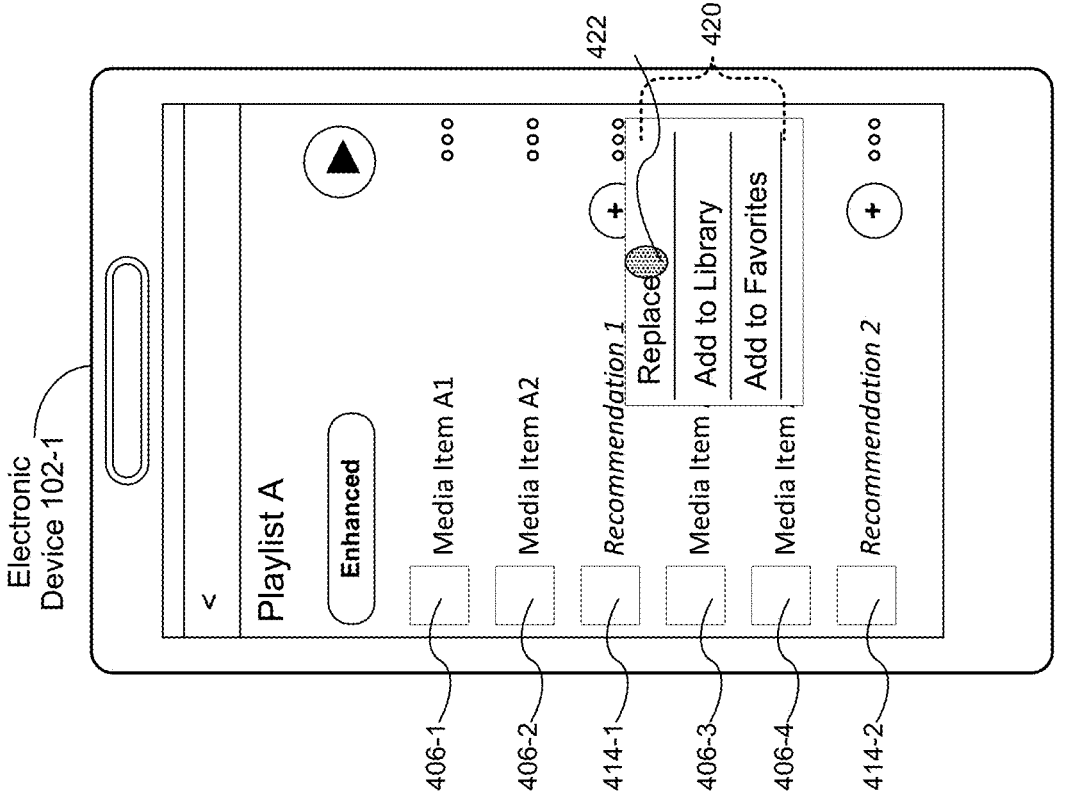
Figure 4C:
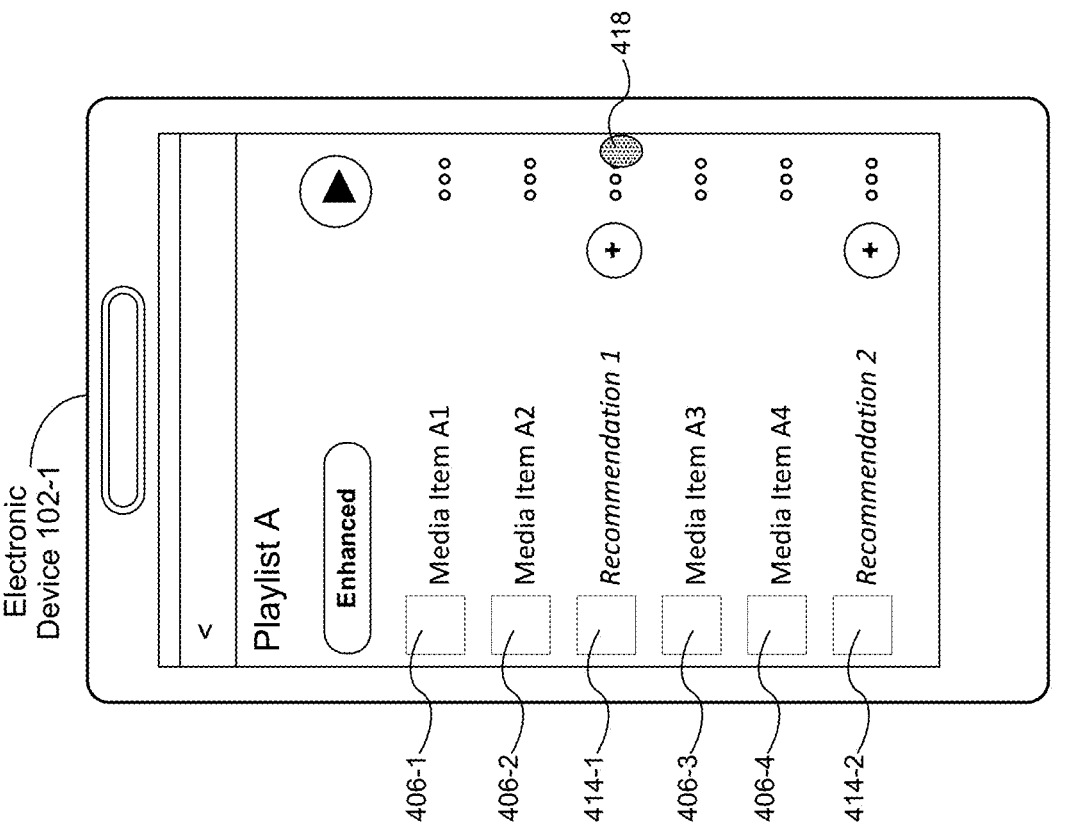

FIG. 4C illustrates a user input 418 requesting to view additional options for Recommendation 1 (414-1). In some embodiments, in response to the user input 418, the electronic device 102-1 displays a menu 420 including a plurality of selectable options for the media item (e.g., Recommendation 1), as illustrated in FIG. 4D. For example, the menu 420 includes options such as replace (e.g., to replace Recommendation 1 with another recommendation), add to library (e.g., to add the recommendation to the user's library of media content, as stored by the media providing service), and add to favorites (e.g., to add the recommendation to a list of the user's favorite media items, which the user can access using the media providing service). Alternative and/or additional options may be presented to the user in menu 420. Further, in some embodiments, different menus are provided based on the media item associated with the menu (e.g., recommended media items include an option to replace, while media items from Playlist A includes a different set of menu options). For example, the menu options (e.g., for the media items in Playlist A that are not recommended media items) can include an option to remove and/or reorder media items in Playlist A.

FIG. 4D further illustrates receiving a user input 422 selecting "Replace" from the menu 420. In response to the user input 422, the electronic device 102-1 updates the user interface to replace Recommendation 1 with Recommendation 13 (414-13). For example, the electronic device replaces Recommendation 1 with a new recommendation at a same position in Playlist A. In some embodiments, the user selects (e.g., via user input 424), an option to add 415-13 the Recommendation 13 to Playlist A. In some embodiments, in response to the user adding the Recommendation 13 to Playlist A, Playlist A is updated (e.g., a data structure storing the set of media items in Playlist A is updated) to include Recommendation 13. In some embodiments, the media item that is Recommendation 13 is added to the end of the playlist (e.g., adding a recommended media item does not change the order of the original set of media items of Playlist A). In some embodiments, the media item that is Recommendation 13 is added to the playlist at the current position (e.g., interleaved between existing media items in Playlist A), which changes the order of the set of media items of Playlist A. In some embodiments, as illustrated in FIG. 4F, after the Recommendation 13 has been added to Playlist A, the option to add 415-13 is no longer displayed in the user interface for Recommendation 13 (e.g., and the representation of Recommendation 13 is optionally no longer visually distinguished from the media items of Playlist A).

In some embodiments, the electronic device 102-1 tracks the interaction of the user with the recommended media items and updates the recommended media items based on the user interaction. For example, if the user "skips" a recommendation (e.g., does not playback the recommended media item for more than a threshold amount of time (e.g., 30 seconds)), the electronic device 102-1 changes one or more other recommended media items that are displayed later in the set of media items (e.g., the next recommended media item (e.g., Recommendation 2) is updated to a different media item). In some embodiments, if the user requests to "replace" a recommended media item with another media item, the electronic device 102-1 updates one or more recommended media items that are displayed later in the set of media items (e.g., based at least in part on a similarity of the one or more recommended media items to the media item the user requested to "replace"). For example, the electronic device 102-1 changes the recommended media items based on the media items recommended to the user earlier in Playlist A that the user has listened to (e.g., or added to the Playlist A, or added as a favorite), and that the user has skipped or replaced, by updating the recommendation selection process to reflect the user's current preferences (e.g., as indicated by the user interactions).

Figures 4E, 4F:
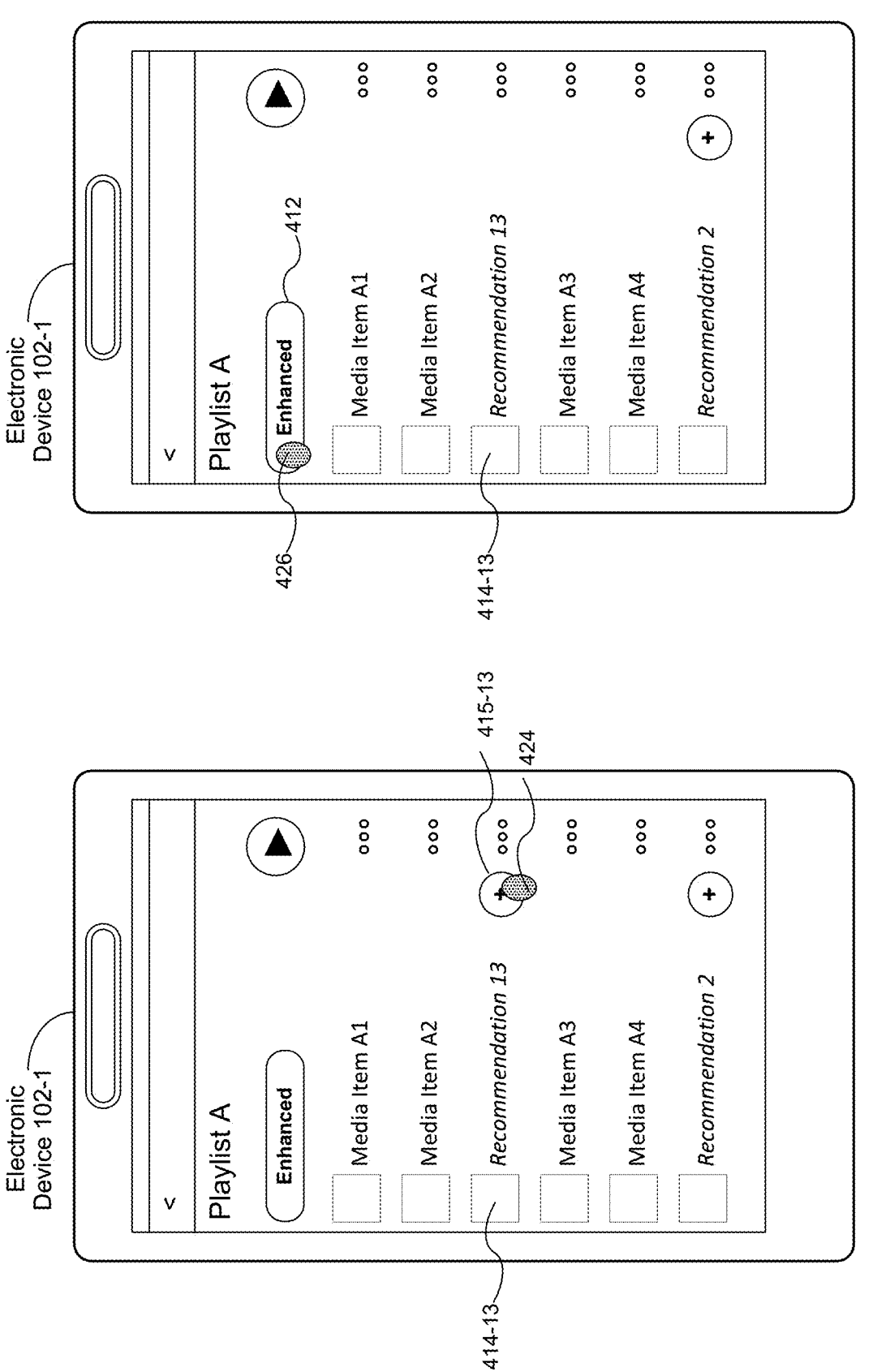

FIG. 4F illustrates the user toggling the Enhance option off (e.g., by a user input 426 selecting the indication 412). For example, in response to the user input 426, the representations of recommended media items are no longer displayed in the user interface displaying the media items of Playlist A. For example, in FIG. 4G, the set of media items 406 are redisplayed (e.g., as in FIG. 4A) without any interleaved recommended media items. In some embodiments, recommended media items that were added to the Playlist A (e.g., while the Enhance option was on), are displayed in the user interface (e.g., because Playlist A has been updated to include the recommended media items). For example, Recommendation 13 would be displayed at the bottom of Playlist A (e.g., if the user scrolls down to view additional representations of media items in Playlist A).

Figure 4H:
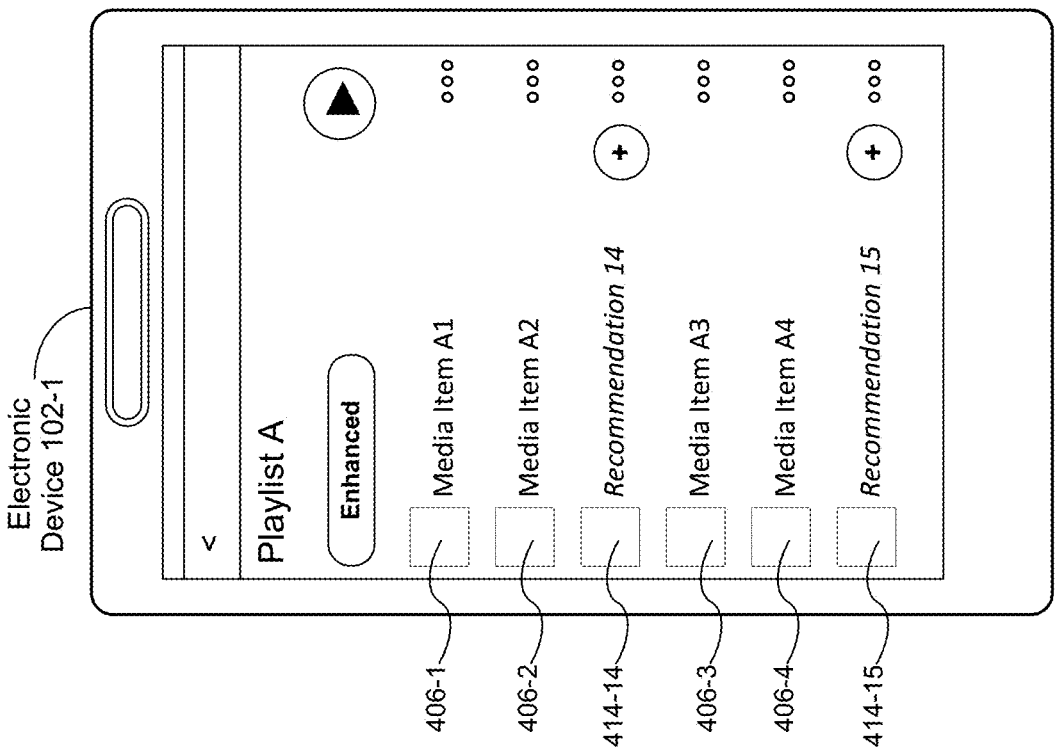
Figure 4G:
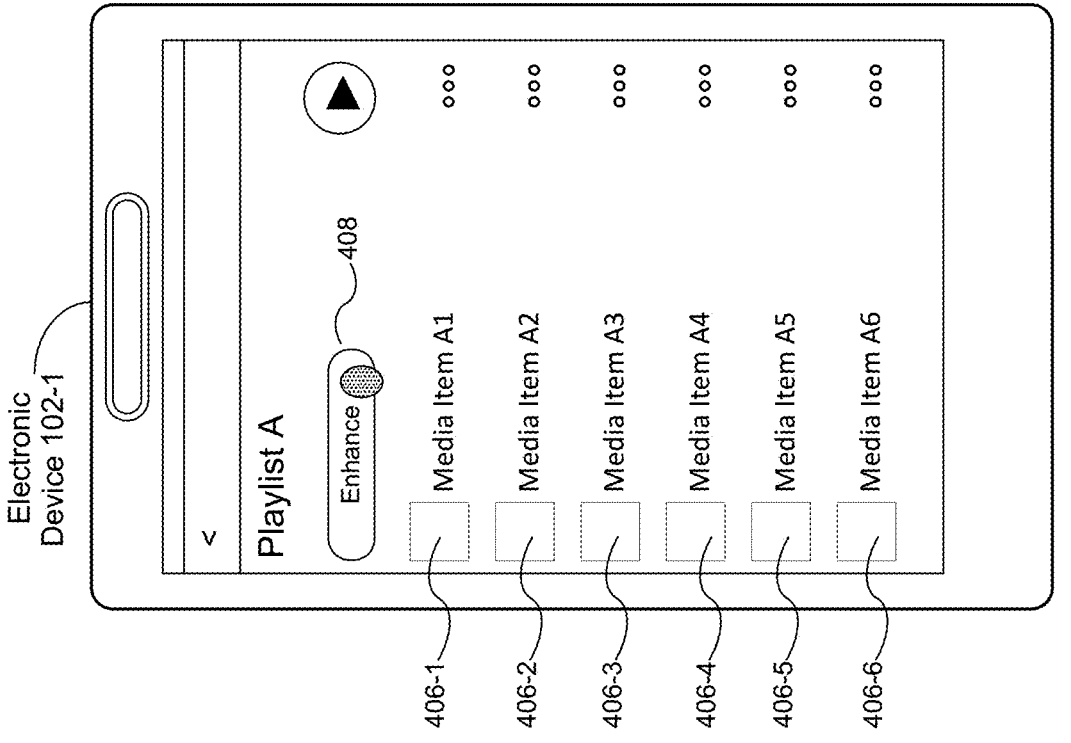

The user is enabled to turn the Enhance option on and/or off by toggling the Enhance button 408. For example, in FIG. 4G, the user selects the Enhance button 408 to toggle the enhance feature back on (e.g., after turning Enhance off in FIG. 4F). In some embodiments, in response to the user toggling the Enhance option on, after the Enhance option has already been toggled on and off (e.g., at least once) during the current listening session, the electronic device 102-1 replaces the recommended media items with different recommended media items, as illustrated in FIG. 4H (e.g., new Recommendation 14 (414-14) and new Recommendation 15 (414-15) are interleaved in Playlist A). In some embodiments, within a current listening session, the electronic device 102-1 does not replace the recommended media items with different recommended media content items (e.g., the same recommendations presented before the user toggled the Enhance option off are redisplayed for the user).

For example, the recommended media items are updated for distinct listening sessions (e.g., where the user has ceased playback for a predefined time period, or the user has exited an application of the media-providing service), such that during a subsequent listening session, new recommendations are presented to the user while the Enhance feature is enabled for Playlist A (e.g., even if the user never toggled the Enhance feature off before ending the previous listening session). In some embodiments, new recommendations are provided according to a predetermined time interval (e.g., every 24 hours).

Accordingly, the user is enabled to view recommendations within the user's own user-curated playlist (e.g., Playlist A) by toggling the "enhance" option on, and the user can easily remove recommended media items from being displayed (e.g., and played back) by toggling the "enhance" option off. This enables the user to experience recommended media items without modifying the user's original playlist, thereby providing an improved user experience. In some embodiments, the recommended media items are selected based on a similarity to the media items that are in the user-curated playlist. Thus, the user is provided with recommendations identified based on the user's user-curated playlist, and plays back the recommendations interleaved with the user's user-curated playlist, which provides a hybrid experience for the user to provide some variety (e.g., recommended media items) within the user's own user-curated playlist, without the user losing the user's original playlist (e.g., because the user-curated playlist is stored without being modified by the recommended media items).

It should be understood that, although FIGS. 4A-4H describe a touch input on a virtual button to active/deactivate the enhance playlist features described herein, in some embodiments a speech input (or other user interface modality) may be used to trigger analysis operations.

Further, it should be understood that, although FIGS. 4A-4H provide an example in which recommendations are interspersed within the user's own curated playlist, the user-curated playlist may have been partially curated by additional users (e.g., together with the user) and/or fully-curated by one or more other user's (e.g., the user is able to add recommendations to a friend's playlist).

FIGS. 5A-5B are flow diagrams illustrating a method 500 of providing media items to a user as recommendations within a user-curated playlist, in accordance with some embodiments. Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device.

Referring now to FIG. 5A, in performing the method 500, the electronic device provides (502), to a user (e.g., streams, plays back and/or displays on the electronic device, or on a second electronic device distinct from the electronic device), a user-curated playlist, the user-curated playlist including an ordered set of media items that were added by the user. For example, Playlist A described in FIGS. 4A-4H is a user-curated playlist that includes a set of media items 406 selected by the user and added to Playlist A by the user.

In some embodiments, the user-curated playlist is a playlist curated by the user. In some embodiments, the user-curated playlist is a playlist curated by a user of a media providing service and made available to one or more other users (e.g., a public or shared playlist). In some embodiments, the user-curated playlist is a playlist that has been partially or fully curated by one or more other users (i.e., human users). In some embodiments, the user-curated playlist is a set of media items for which the user (or another user) has taken a predefined action in selecting or denoting media items (e.g., for which the user has indicated a media item as a favorite media item). That is, in some embodiments, the user-curated playlist is a playlist that is implicitly-curated (e.g., automatically) by the user through the user's action. In some embodiments, the user-curated playlist is a playlist that the user has expressly created and (e.g., manually) added media items to.

In some embodiments, the playlist need not be a user-curated playlist. Rather, in some embodiments, the playlist is a playlist that is curated for the user (e.g., algorithmically, based on a first recommendation algorithm). For example, in some embodiments, the playlist comprises a set of the user's (or another user's) most frequently consumed media items (e.g., the user's top tracks of the year). In some embodiments, the playlist is a "daily mix" generated for the user by the media providing service (e.g., using a recommendation algorithm for the daily mix). The user can then select an option to "enhance" the daily mix, as described below, by adding recommendations that are not generated by the first recommendation algorithm (e.g., that are generated by a second recommendation algorithm distinct from the first generated algorithm). For example, whereas the daily mix algorithm may tend to provide tracks that the user is familiar with, the enhance option may add "discovery" tracks that the user is less likely to be familiar with (e.g., using a discovery recommendation algorithm).

While providing a first media item in the ordered set of media items, the electronic device receives (504) a first user input selecting an option to include recommended media items in the user-curated playlist. For example, in FIG. 4A, the user input 410 turns on the enhance feature. In some embodiments, the first user input is a voice command (e.g., "Hey Spotify, enhance this playlist"). In some embodiments, the first user input is a single user input (e.g., a single tap on a virtual button, or a single voice command) that results in the inclusion of a plurality of recommended media items in the user-curated playlist (e.g., interspersed in the user-curated playlist).

In response to the first user input, the electronic device updates (506) the user-curated playlist to include a first recommended media item, the first recommended media item selected without user intervention based at least in part on attributes of the user-curated playlist. The first recommended media item is positioned in the user-curated playlist (e.g., displayed in a visual display of the playlist, or configured to be played back in the playlist) in between media items that were added to the ordered set of media items by the user. For example, in FIG. 4B, Recommendation 1 (e.g., the first recommended media item) is positioned in between Media Item A2 and Media Item A3 of Playlist A, such that the first recommended media item is interleaved with the media items added by the user. In some embodiments, the first recommended media item is not already included in the user-curated playlist (e.g., before the first user input, the user-curated playlist consists of items selected and/or added to the playlist by the user) (e.g., the first recommended media item is distinct from the media items in the user-curated playlist). For example, the first recommended media item is a media item presented to the user in addition to the media items of Playlist A. In some embodiments, the first recommended media item is selected without user intervention, but is only provided to the user in accordance with a user request to include the first recommended media item (e.g., in response to the user toggling the Enhance button on). In some embodiments, the electronic device provides an indication of the first recommended media item on a display of the electronic device (e.g., Recommendation 1, FIG. 4B).

In some embodiments, the device provides one or more user-selectable options for (i) saving the first recommended media item to the user-curated playlist (to be available later) (e.g., option 415-1), (ii) requesting a different recommended media item to replace the first recommended media item, and/or (iii) playing (e.g., streaming) the first recommended media item without saving the first recommended media item to the user-curated playlist (e.g., the first recommended media item is not available in a subsequent session of the user playing back the user-curated playlist). For example, as described with reference to FIG. 4D, menu 420 includes a plurality of user-selectable options for Recommendation 1. In some embodiments, the first recommended media item is played (e.g., at its respective position within the playlist) automatically (e.g., Recommendation 1 begins playback after playback of Media Item A2 is complete), but the user is enabled to "skip" the recommended media item (e.g., before the recommended media item has begun playback, or during playback of the recommended media item).

In some embodiments, the first recommended media item is (508) an audio item. For example, the recommended media item comprises a song, a podcast, an audiobook, (or other spoken word). In some embodiments, the first recommended media item is a video content item.

In some embodiments, the electronic device displays (510) the user-curated playlist on a display of the electronic device, wherein updating the user-curated playlist to include the first recommended media item includes displaying an indication of the first recommended media item at its respective position in the user-curated playlist. For example, the playlist is presented as a list and indications of the recommended media items are displayed in the list at their respective positions, as described with reference to FIG. 4B. In some embodiments, the indications of the recommended media items are displayed with one or more visual properties distinct from the ordered set of media items that were added by the user (e.g., the recommended media items are displayed with an icon indicating they are not part of the original playlist).

In some embodiments, in accordance with a determination that the user selects the first recommended media item for playback, the electronic device updates (512) the user-curated playlist to include additional recommended media items for inclusion in the user-curated playlist. For example, the additional recommended media items are selected based at least in part on attributes of the first recommended media item. For example, if the user plays back Recommendation 1, the electronic device updates Recommendation 2 to a recommended media item that is similar to Recommendation 1.

In some embodiments, in accordance with a determination that the user does not select the first recommended media item for playback, the electronic device replaces (514) the first recommended media item with a second recommended media item at the position in the user-curated playlist in which the first recommended media item was positioned. In some embodiments, the user not selecting the first recommended media item comprises the user requesting to remove the first recommended media item (e.g., or to replace the first recommended media item, as described with reference to FIG. 4D).

In some embodiments, the electronic device updates (516) the user-curated playlist to include a plurality of recommended media items and positions a respective recommended media item of the plurality of recommended media items according to a predefined interval in the user-curated playlist in between media items that were added to the ordered set of media items by the user (e.g., after every two media items from the user-curated playlist, a recommended media item is added as the third item, as shown in FIG. 4B). In some embodiments, the predefined interval is a random interval (e.g., recommended media items are added at different positions in the playlist that are not defined according to a fixed interval).

In some embodiments, the electronic device receives (518) a second user input deselecting the option to include recommendations in the user-curated playlist. In some embodiments, in response to the second user input, the electronic device removes an indication of the first recommended media item from the user-curated playlist. For example, as described with reference to FIGS. 4F-4G, the user selects to toggle off the Enhance option (e.g., and the electronic device 102-1 removes the indications of any of the plurality of recommended media items from the user-curated playlist).

In some embodiments, the electronic device receives (520) a third user input requesting to save the first recommended media item to the user-curated playlist. In some embodiments, the electronic device, in response to the third user input, saves the first recommended media item to the ordered set of media items (e.g., when the user returns to their playlist (e.g., in a subsequent listening session), the recommended media item is saved as part of the playlist). In some embodiments, the recommended media item is saved within the playlist at the position in which it was presented. In some embodiments, in accordance with a determination that the user does not add the additional media item to the playlist, after the user returns to the playlist after a predefined time period (e.g., during a subsequent listening session), the playlist is presented without the additional media items (e.g., the original playlist is not modified with the recommended media items).

In some embodiments, the electronic device selects (522) a third recommended media item to include in the user-curated playlist based on user interaction with a previously presented recommended media item (e.g., the first recommended media item). For example, the electronic device determines if the user interaction is a positive or negative interaction, and if the interaction is a positive interaction, the device provides additional recommendations similar to the previously recommended media item that received the positive interaction. In some embodiments, if the interaction is a negative interaction, the device does not provide additional recommendations similar to the previously recommended media item that received the negative interaction (e.g., the device provides a recommendation for a dissimilar media item). For example, a negative interaction comprises "skipping" the recommended media item within a predetermined amount of time (e.g., during playback or before playback), a selection of a thumbs down/dislike button, and/or requesting the first recommended media item to be replaced by a different recommended media item. In some embodiments, a positive interaction comprises "liking" the recommended media item (e.g., selecting a heart indication or adding the media item as a favorite), playing back the full length of the recommended media item, and/or saving the recommended media item to the playlist. In some embodiments, a positive interaction comprises not receiving any user interaction (e.g., wherein the user does not remove the first recommended media item from the user-curated playlist).

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications. to thereby enable others skilled in the art to best utilize the embodiments and various embodiments with various modifications as are suited to the particular use contemplated.

What is claimed is:
1. A method, comprising:
at an electronic device executing a media application:

providing, to a user of the media application, a user-curated playlist, the user-curated playlist including an ordered set of media items that were added by the user;

displaying, in a user interface of the media application, a toggle button to turn on and off an option to reversibly include recommended media items interleaved within the user-curated playlist;

receiving a first user input selecting the toggle button to turn on the option to reversibly include recommended media items interleaved within the user-curated playlist;

in response to the first user input selecting the toggle button to toggle on the option to reversibly include recommended media items interleaved within the user-curated playlist:

reversibly including a set of recommended media items, including a first recommended media item, interleaved within the user-curated playlist, wherein the set of recommended media items are selected without user intervention based at least in part on attributes of the user-curated playlist, wherein the first recommended media item is interleaved at a position in the user-curated playlist in between media items that were added to the ordered set of media items by the user;

while displaying a representation of the first recommended media item interleaved with media items in the ordered set of media items:

receiving a second user input requesting to add the first recommended media item to the user-curated playlist; and in response to the second user input, adding the first recommended media item to the ordered set of media items;

after adding the first recommend media item to the ordered set of media items, receiving a third user input deselecting the toggle button to turn off the option to reversibly include recommended media items interleaved within the user-curated playlist; and in response to the third user input, maintaining the first recommended media item in the user-curated playlist and excluding others of the set of recommended media items from the user-curated playlist.

2. The method of claim 1, further comprising, in accordance with a determination that the user selects the first recommended media item for playback, updating the user-curated playlist to include additional recommended media items for inclusion in the user-curated playlist.

3. The method of claim 1, further comprising, in accordance with a determination that the user does not select a second recommended media item for playback, replacing the second recommended media item with a third recommended media item at the position in the user-curated playlist in which the second recommended media item was positioned.

4. The method of claim 1, further comprising:

updating the user-curated playlist to include a plurality of recommended media items; and positioning a respective recommended media item of the plurality of recommended media items according to a predefined interval in the user-curated playlist in between media items that were added to the ordered set of media items by the user.

5. The method of claim 1, wherein the first recommended media item is an audio item.

6. The method of claim 1, further comprising, selecting a third recommended media item to include in the user-curated playlist based on user interaction with a previously presented recommended media item.

7. The method of claim 1, further comprising, while displaying the toggle button in the user interface of the media application, displaying an indication of the first recommended media item interleaved with media items in the ordered set of media items at its respective position in the user-curated playlist.

8. The method of claim 1, wherein the first user input is received during a first listening session and the method further comprises:

during a subsequent listening session after the first listening session, providing the user-curated playlist; and in response to a fourth user input selecting the toggle button, reversibly including a fourth recommended media item, distinct from the first recommended media item, interleaved within the user-curated playlist, the fourth recommended media item selected without user intervention based at least in part on attributes of the user-curated playlist, wherein the fourth recommended media item is interleaved at a position in the user-curated playlist in between media items that were added to the ordered set of media items by the user, including displaying, in the user interface of the media application, an indication of the fourth recommended media item interleaved with media items in the ordered set of media items.

9. The method of claim 8, wherein the subsequent listening session occurs after the user has ceased playback of the user-curated playlist for a predefined time period and/or after the user has exited the media application.

10. A computer system executing a media application, comprising:

one or more processors; and memory storing one or more programs, the one or more programs including instructions for:

providing, to a user of the media application, a user-curated playlist, the user-curated playlist including an ordered set of media items that were added by the user;

displaying, in a user interface of the media application, a toggle button to turn on and off an option to reversibly include recommended media items interleaved within the user-curated playlist;

receiving a first user input selecting the toggle button to turn on the option to reversibly include recommended media items interleaved within the user-curated playlist;

in response to the first user input selecting the toggle button to toggle on the option to reversibly include recommended media items interleaved within the user-curated playlist:

reversibly including a set of recommended media items, including a first recommended media item, interleaved within the user-curated playlist, wherein the set of recommended media items are selected without user intervention based at least in part on attributes of the user-curated playlist, wherein the first recommended media item is interleaved at a position in the user-curated playlist in between media items that were added to the ordered set of media items by the user;

while displaying a representation of the first recommended media item interleaved with media items in the ordered set of media items:

receiving a second user input requesting to add the first recommended media item to the user-curated playlist; and in response to the second user input, adding the first recommended media item to the ordered set of media items;

after adding the first recommend media item to the ordered set of media items, receiving a third user input deselecting the toggle button to turn off the option to reversibly include recommended media items interleaved within the user-curated playlist; and in response to the third user input, maintaining the first recommended media item in the user-curated playlist and excluding others of the set of recommended media items from the user-curated playlist.

11. The computer system of claim 10, wherein the one or more programs include instructions for, in accordance with a determination that the user selects the first recommended media item for playback, updating the user-curated playlist to include additional recommended media items for inclusion in the user-curated playlist.

12. The computer system of claim 10, wherein the one or more programs include instructions for, in accordance with a determination that the user does not select a second recommended media item for playback, replacing the second recommended media item with a third recommended media item at the position in the user-curated playlist in which the second recommended media item was positioned.

13. The computer system of claim 10, wherein the one or more programs include instructions for:

updating the user-curated playlist to include a plurality of recommended media items; and positioning a respective recommended media item of the plurality of recommended media items according to a predefined interval in the user-curated playlist in between media items that were added to the ordered set of media items by the user.

14. The computer system of claim 10, wherein the first recommended media item is an audio item.

15. The computer system of claim 10, wherein the one or more programs include instructions for selecting a third recommended media item to include in the user-curated playlist based on user interaction with a previously presented recommended media item.

16. A non-transitory computer-readable storage medium storing one or more programs for execution by a computer system executing a media application, with one or more processors, the one or more programs comprising instructions for:

providing, to a user of the media application, a user-curated playlist, the user-curated playlist including an ordered set of media items that were added by the user;

displaying, in a user interface of the media application, a toggle button to turn on and off an option to reversibly include recommended media items interleaved within the user-curated playlist;

receiving a first user input selecting the toggle button to turn on the option to reversibly include recommended media items interleaved within the user-curated playlist;

in response to the first user input selecting the toggle button to toggle on the option to reversibly include recommended media items interleaved within the user-curated playlist:

reversibly including a set of recommended media items, including a first recommended media item, interleaved within the user-curated playlist, wherein the set of recommended media items are selected without user intervention based at least in part on attributes of the user-curated playlist, wherein the first recommended media item is interleaved at a position in the user-curated playlist in between media items that were added to the ordered set of media items by the user;

while displaying a representation of the first recommended media item interleaved with media items in the ordered set of media items:

receiving a second user input requesting to add the first recommended media item to the user-curated playlist; and in response to the second user input, adding the first recommended media item to the ordered set of media items;

after adding the first recommend media item to the ordered set of media items, receiving a third user input deselecting the toggle button to turn off the option to reversibly include recommended media items interleaved within the user-curated playlist; and in response to the third user input, maintaining the first recommended media item in the user-curated playlist and excluding others of the set of recommended media items from the user-curated playlist.

17. The computer system of claim 10, wherein the one or more programs include instructions for, while displaying the toggle button in the user interface of the media application, displaying an indication of the first recommended media item interleaved with media items in the ordered set of media items at its respective position in the user-curated playlist.

18. The computer system of claim 10, wherein the first user input is received during a first listening session and the one or more programs include instructions for:

during a subsequent listening session after the first listening session, providing the user-curated playlist; and in response to a fourth user input selecting the toggle button, reversibly including a fourth recommended media item, distinct from the first recommended media item, interleaved within the user-curated playlist, the fourth recommended media item selected without user intervention based at least in part on attributes of the user-curated playlist, wherein the fourth recommended media item is interleaved at a position in the user-curated playlist in between media items that were added to the ordered set of media items by the user, including displaying, in the user interface of the media application, an indication of the fourth recommended media item interleaved with media items in the ordered set of media items.

19. The computer system of claim 18, wherein the subsequent listening session occurs after the user has ceased playback of the user-curated playlist for a predefined time period and/or after the user has exited the media application.

20. The non-transitory computer-readable storage medium of claim 16, wherein the one or more programs include instructions for, in accordance with a determination that the user selects the first recommended media item for playback, updating the user-curated playlist to include additional recommended media items for inclusion in the user-curated playlist.

21. The non-transitory computer-readable storage medium of claim 16, wherein the one or more programs include instructions for, in accordance with a determination that the user does not select a second recommended media item for playback, replacing the second recommended media item with a third recommended media item at the position in the user-curated playlist in which the second recommended media item was positioned.

* * * * *